United States Patent Office 3,362,360
Patented Jan. 9, 1968

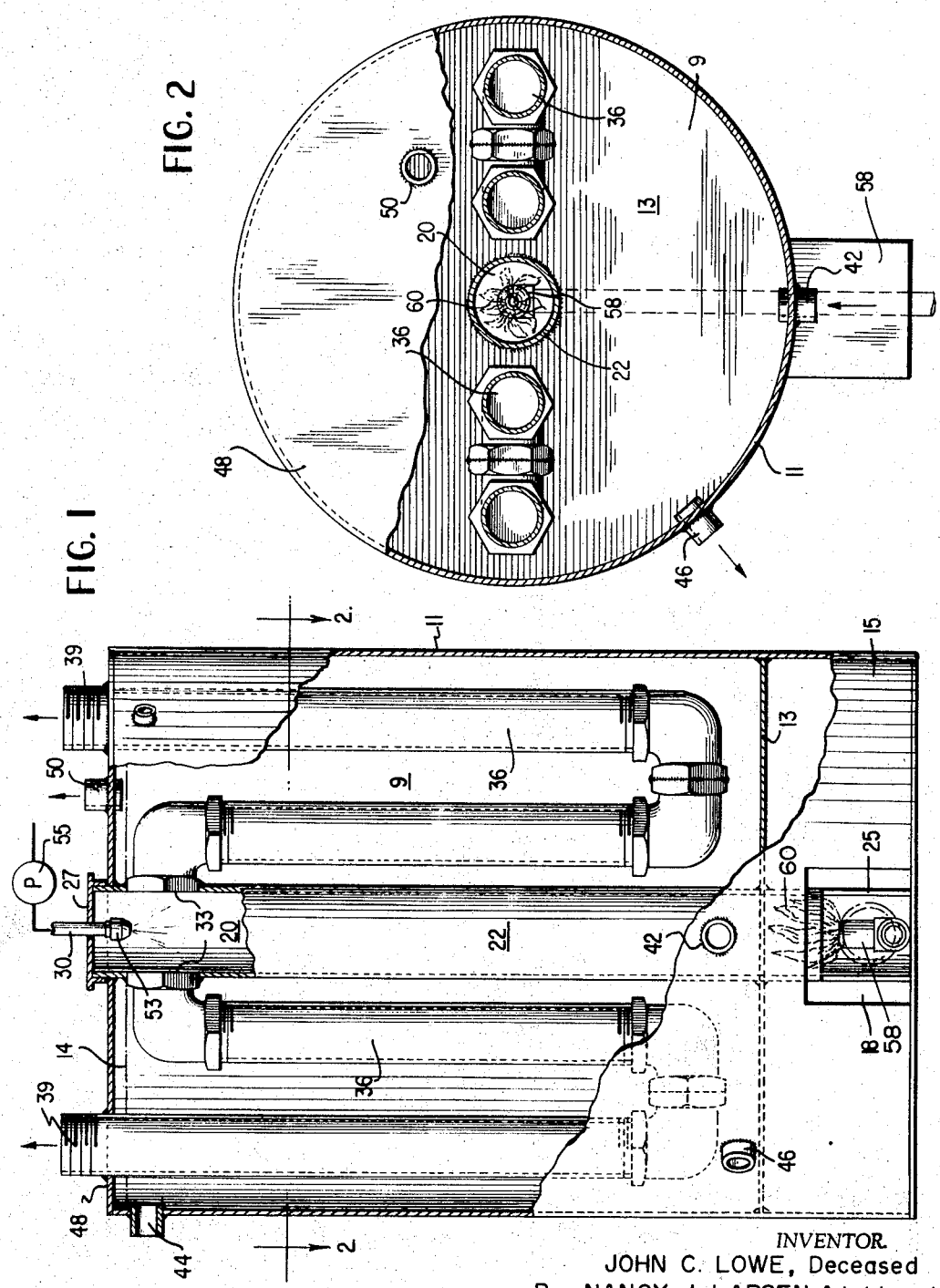

3,362,360
METHOD AND APPARATUS FOR INCINERATING WASTE MATERIAL
John C. Lowe, deceased, late of York, Pa., by Nancy J. Larsen, administratrix, Brooklyn Heights, N.Y., assignor to Broadway Research and Development Corporation, a corporation of Pennsylvania
Filed Dec. 5, 1966, Ser. No. 599,328
2 Claims. (Cl. 110—7)

ABSTRACT OF THE DISCLOSURE

A method and apparatus to dispose of waste combustible material in a liquid solution by atomizing the same at the upper end of a closely confined path within a vertical tube while hot combustion gases rise in countercurrent manner from a burner at the bottom of the path and are hot enough to flash the liquid into vapor and contain enough free oxygen to burn the combustible waste content of the solution.

---

This application is a continuation-in-part of application, Ser. No. 327,308, filed Dec. 2, 1963, by the said John C. Lowe, now Patent No. 3,295,478, granted Jan. 3, 1967.

This invention pertains to a method and apparatus designed to perform the method for the combustion of liquid wastes by vaporization of the liquid components of such wastes, combustion of the organic components thereof, and separation of any solid products following such combustion to permit recovery of any useful by-products thereof.

Many industrial processes exist in which organic liquid wastes are produced and the increased attention being focused upon stream pollution and other effects of currently practiced waste disposal techniques may in time lead to an outright prohibition against discharging certain wastes to streams, city sewage systems or even septic tanks. The method and apparatus of this invention may be used for the incineration of such organic wastes. This invention may be used, for example, to treat the synthetic detergent wastes accumulated in the practice of the invention of co-pending application Ser. No. 304,183, filed Aug. 23, 1963, now abandoned, and Ser. No. 554,275, filed May 12, 1966. Although the instant invention will be described in terms of synthetic detergent concentrate disposal it will be apparent to those of ordinary skill in the art that other liquid organic wastes may be likewise treated.

In this invention, liquid organic wastes are burned by dispersing the wastes in finely divided form into a stream of hot gases containing free oxygen. The temperature and amount of gas is sufficient to vaporize enough of the non-combustible liquid portion of the waste that the free oxygen content of the gas is sufficient to burn the combustible, often non-vaporizable, portions of the waste. The hot gas preferably is a flue gas produced by burning a fuel in an excess of oxygen; the fuel, in turn is generally a carbonaceous gas, liquid or solid, for example, city gas, natural gas, LP gas, fuel oil, coal, coke, etc.

In this invention the heat content of the exhaust gas from waste burning is conveniently exploited by locating the combustion zone within a body of process liquid to be heated. Also the exhaust gases from the combustion zone may be additionally passed in indirect heat exchange with the process liquid to be heated. By finely dividing or even atomizing the liquid waste and by exploiting the heat values, the process and apparatus of this invention makes the burning of many organic liquid wastes, which in themselves are insufficient for combustion in cool air, or in massive form economically feasible, which comprises the principal feature described and claimed in said application, Ser. No. 327,308.

The apparatus of the invention is of simple construction and comprises, in general, a tank having a vertical waste combustion chamber therein of restricted cross-section which, if desired, may be employed without the tank being present. This combustion chamber is elongated to provide a passage sufficient for evaporation of non-combustible liquid and burning of the combustible portion of the liquid waste. The combustion chamber is provided at the upper end with a nozzle for very finely atomizing the liquid waste and spraying it downwardly and at the lower end, said chamber has burner means to produce hot free-oxygen-containing gas which rises to intimately contact and vaporize the liquid part of said waste, burn the combustible part and permit any noncombustible or vaporizable parts to descend for removal from the chamber for recovery or otherwise.

The combustion chamber is also provided with one or more exits for exhaust gas and these exits, in turn, lead to heat exchange means, e.g., fluid conduits passing through the tank. The fluid conduits preferably are convoluted to provide an elongated flow path for exhaust gas in indirect heat exchange with the process fluid in the tank. The tank, outside of the exhaust gas conduits, is provided with an entry and an exit for the process liquid to be heated. The tank with the generally vertically arranged combustion chamber contained therein is supported in such fashion as to leave room under the bottom of the combustion chamber for the entry of the hot gas and advantageously enough room is provided for placing a hot gas generator directly beneath the hot gas entry for the combustion chamber. Thus, provision preferably is made for placing an oil, gas or other burner directly beneath the combustion chamber.

The invention will be better understood from a consideration of the accompanying drawing in which:

FIGURE 1 is a side view, partly cut away, of the preferred apparatus for performing the process of this invention; and FIGURE 2 is a cross-sectional view along the line 2—2 of FIGURE 1, showing also a fuel burner.

The figures show a tank 9 having the liquid-tight side 11, which preferably is cylindrical, and the bottom 13. The tank is shown as containing a process liquid 14 which is to be heated. As can be seen, the sides 11 may conveniently be extended downward below the bottom 13 to form the support member 15. This support provides one or a plurality of openings 18 for entry of gas to the combustion chamber. Any ash or non-combustible solid material, such as salts, which are formed in the combustion and vaporizing process and not carried away in the exhaust gas may accumulate adjacent the bottom of the support whence it may be removed as desired.

In the embodiment shown, the combustion chamber 20 is formed by the vertical tube 22 which also is preferably cylindrical. Preferably, the diameter is very substantially less than the length to provide a restricted cross-section therefor. As can be seen, a portion 25 of the tube may be extended downwardly to comprise the lower part of the combustion chamber and including access to the atmosphere to provide for entry of free-oxygen-containing gas such as air. The top of the combustion chamber 20 preferably is provided with a cover 27 which contains a hole for entry of the waste line 30. The cover 27 may be merely a loose cap resting by gravity upon the upper end of the tube 22 so as to discharge any excess gas pressure in the chamber 22, if it occurs, thus functioning as a safety valve. The combustion chamber 20 is also provided with laterally directed exhaust gas outlets 33 leading to conduits 36 which, as shown, wind through the tank 9, venting to the atmosphere or to a stack at 39, outside the tank. The tank is provided with one or more process fluid, e.g., water, entry openings, such as at 42 and one or more water exit lines, such as 44. The tank may also be provided with a normally closed drain opening such as 46 for removal, when necessary, of sludge, corrosion products, etc., from the tank and when a top such as 48 is provided it will usually contain a vent such as 50 for removal of gases accumulating in the tank, which details form the subject of said copending application, Ser. No. 327,308.

The waste inlet line 30 is provided with an atomizing nozzle 53 which is supported by cover 27 and is directed downwardly into the upper part of the combustion chamber 20 and usually will also be associated with a pump, as symbolically shown at 55 for insuring flow of the liquid waste at a desired rate and pressure. The pump 55 also may be such as to mix the liquid waste with atomizing air, if desired. Also, as can be readily seen, the vertical and elevated position of the chamber 20 and the provision of the opening 18 at the bottom thereof, allow a fuel burner 58 such as a gas burner or fuel oil burner to be placed so as to discharge the hot products of combustion directly vertically upward into the lower part of the combustion chamber. Such arrangement usually will be adequate to insure introduction of hot free-oxygen-containing gas, such as air, to the combustion chamber, the flames 60 from the burner usually being of sufficient force to draw excess air directly from the atmosphere into the chamber.

The rising hot products of combustion, which preferably contain a certain fraction of free oxygen, directly and intimately engage the descending atomized spray of waste material. The highest temperature of such combustion products will occur in the upper part of chamber 20. Hence, the spray of waste material initially will be preheated and the vaporizable portion will immediately be flashed into vapor while the combustible parts will be burned, thus further increasing the temperature. Solid products, such as ash and salts, if any salts exist in the waste, will descend to the bottom of tube 22 and may be removed and recovered. Many such waste materials contain salts of various kinds, such as calcium chloride, and these can be removed and sold as unrefined by-products.

In operation it has been found that a waste detergent solution containing about 10% combustible sulfonate detergent, the balance water may be incinerated at about 1400° F. in the combustion chamber, the liquid waste being supplied to the nozzle at about 100 p.s.i.g. and a rate of about 6 gallons/hour. A combustion chamber constructed of light weight boiler tube has been found satisfactory.

From the foregoing, it will be seen that the process and apparatus provided by the present invention results in a high degree of efficiency due to the injection of an atomized spray of liquid waste material into the upper part of a vertical combustion chamber of restricted cross-section, while hot products of combustion, and preferably a certain fraction of free oxygen, are introduced vertically upward from the bottom of the combustion chamber. Such arrangement affords maximum use of the generated heat to (1) flash the aqueous or liquid portion of the waste into vapor for removal through outlets 33, (2) burn combustible waste such as organic materials and thereby enhance the temperature, and (3) permit the descent of any recoverable waste products of value.

The countercurrent directions of the rising hot products of combustion and the descending spray of atomized liquid waste within a confined chamber insures complete vaporization of the vaporizable liquid components of the liquid waste before it reaches the bottom of the chamber and usually by flashing it into vapor in the upper part of the chamber. If excessive pressure results in the chamber, the loosely fitting cover 27 can readily rise automatically to permit dissipation of the excess pressure, followed by automatic restoration of the cover to its operative position by gravity. The cover therefore functions as an automatic pop-off or blow-off valve.

While the invention has been described and illustrated in its several preferred embodiments, it should be understood that the invention is not to be limited to the precise details herein illustrated and described since the same may be carried out in other ways falling within the scope of the invention as claimed.

I claim:

1. A method for the incineration of liquid wastes containing not more than 10% by weight combustible matter resulting from the processing of solutions contaminated by the same to remove said contaminating waste therefrom by incineration and comprising the steps of dispersing a stream of such liquid wastes into a finely atomized mist and directing it vertically downward into a closely confined path having substantially straight sides, generating at the bottom of said confined path a continuous stream of hot combustion gas containing at least a minor proportion of free oxygen capable of combining with the combustible matter of said liquid wastes to burn it and directing said stream of hot combustion gases vertically upwardly within said confined path directly in opposition to said descending stream of atomized liquid wastes, the temperature of said hot combustion gas being sufficiently high to flash the non-combustible portions of said liquid waste into vapor before said liquid waste passes through said rising stream of hot gas, passing said vapor and products of combustion from the upper portion of said path adjacent the location of the introduction of said mist thereinto while solid ash-like products fall to the lower portion of said path, and relieving any explosive pressure in excess of a predetermined amount at the upper end of said path.

2. Apparatus for disposing of waste combustible organic materials in aqueous solutions thereof comprising in combination, a vertical substantially cylindrical tube forming a combustion chamber having a diameter very substantially less than the length thereof, a cover loosely fitting the upper end of said tube and normally closing it, said cover having a hole therethrough, spray means within the upper end of said tube operable to atomize a stream of said solution and spray the same in the form of a very finely divided mist into the upper part of said chamber, a conduit for said solution connected to said spray means and extending through said hole in said cover, burner means in the lower part of said chamber operable continuously during operation to heat the interior of said chamber and provide a limited amount of free oxygen sufficient to burn the organic content of said solution as sprayed into the upper part of said chamber for direct counter-current contact with the products of combustion rising from said burner, said burner being operable to maintain at least the upper part of the interior of said chamber at a temperature adequate to flash the non-combustible aqueous content of said solution into vapor before any appreciable vaporizable portion thereof passes to the bottom of said chamber while the combustible portion of said solution is burned, and exhaust gas outlet means communicating with the upper portion of said chamber adjacent said spray means and operable to discharge products of combustion and vapor from said chamber as the same moves upward continuously through the atomized solution being discharged into said upper portion of said chamber, thereby to preheat and vaporize the same, said cover being movable relative to the upper end of said tube in response to any explosion pressures in excess of a predetermined amount being generated in said combustion chamber to permit such pressure to be relieved automatically.

References Cited

UNITED STATES PATENTS

| | | | |
|---|---|---|---|
| 1,454,586 | 5/1923 | Griffin. | |
| 1,737,732 | 12/1929 | Sauvage. | |
| 2,537,467 | 1/1951 | Komline | 110—8 |
| 2,808,011 | 10/1957 | Miller et al. | 110—7 |
| 3,295,478 | 1/1967 | Lowe | 110—10 |

JAMES W. WESTHAVER, *Primary Examiner.*